United States Patent
Manabe

[19]

[11] Patent Number: 6,120,115
[45] Date of Patent: Sep. 19, 2000

[54] VEHICLE BRAKING ENERGY CONTROL APPARATUS AND METHOD

[75] Inventor: Kouta Manabe, Toyota, Japan

[73] Assignee: Toyota Jidosha Kabushiki Kaisha, Toyota, Japan

[21] Appl. No.: 09/188,148

[22] Filed: Nov. 9, 1998

[30]  Foreign Application Priority Data

Mar. 19, 1998 [JP] Japan .................................. 10-071049

[51] Int. Cl.$^7$ .............................. B60T 13/74; B60T 7/24; B60T 7/26; B60T 8/32; B60T 8/64
[52] U.S. Cl. .............................. 303/152; 188/156; 303/3; 303/162
[58] Field of Search ................................ 303/152, 113.4, 303/3, 166, DIG. 3, DIG. 4, 13–15, 155, 20, 162, 125; 188/106 P, 156, 158, 159; 318/372, 375, 370, 380, 371, 139, 376; 180/165, 65.1–65.8, 197; 477/4, 188; 701/22, 90, 70, 108

[56] References Cited

U.S. PATENT DOCUMENTS

| | | | |
|---|---|---|---|
| 4,743,074 | 5/1988 | Inoue | 303/152 |
| 4,962,969 | 10/1990 | Davis | 303/3 |
| 5,358,317 | 10/1994 | Cikanek | 303/3 |
| 5,433,512 | 7/1995 | Aoki et al. | 303/152 |
| 5,450,324 | 9/1995 | Cikanek | 303/3 |
| 5,492,192 | 2/1996 | Brooks et al. | |
| 5,539,641 | 7/1996 | Littlejohn | 303/152 |
| 5,632,534 | 5/1997 | Knechtges | 303/152 |
| 5,882,093 | 3/1999 | Enomoto et al. | 303/152 |
| 5,951,115 | 9/1999 | Sakai et al. | 303/152 |
| 5,984,432 | 11/1999 | Otomo et al. | 303/152 |

FOREIGN PATENT DOCUMENTS

7-99704  4/1995  Japan .

*Primary Examiner*—Douglas C. Butler
*Attorney, Agent, or Firm*—Oliff & Berridge, PLC

[57] ABSTRACT

In a braking energy control apparatus and method for a vehicle equipped with an electric motor, a predetermined amount of braking energy can be achieved, regardless of the charged condition of a battery, when a brake pedal is off. Drive wheels are driven by a drive force from an engine and the motor. A braking energy control device performs ensemble control of a regenerative braking energy control device that controls the motor and a friction braking energy control device that controls liquid pressure supplied to wheel cylinders, and thereby controls the braking energy when the brake pedal is on or off. The coordinate control of regenerative braking energy and friction braking energy is performed not only when the brake pedal is on but also when the brake pedal is off. In this occasion, the liquid pressure for the wheel cylinders and the like is increased or decreased and applied thereto by a linear valve unit and a main linear valve unit, in such a manner that friction braking energy is utilized together with regenerative braking energy for the braking operation.

15 Claims, 9 Drawing Sheets

VEHICLE BRAKING ENERGY CONTROL APPARATUS AND METHOD

INCORPORATION BY REFERENCE

The disclosure of Japanese Patent Application No. HEI 10-71049 filed on Mar. 19, 1998 including the specification, drawings and abstract is incorporated herein by reference in its entirety.

BACKGROUND OF THE INVENTION

1. Field of the Invention

The present invention relates to a braking energy control apparatus and method for a vehicle equipped with an electric motor, wherein a vehicle braking force is secured in the form of regenerative braking energy based on a motor and other forms of braking energy, such as friction braking energy.

2. Description of the Related Art

Figure 9:
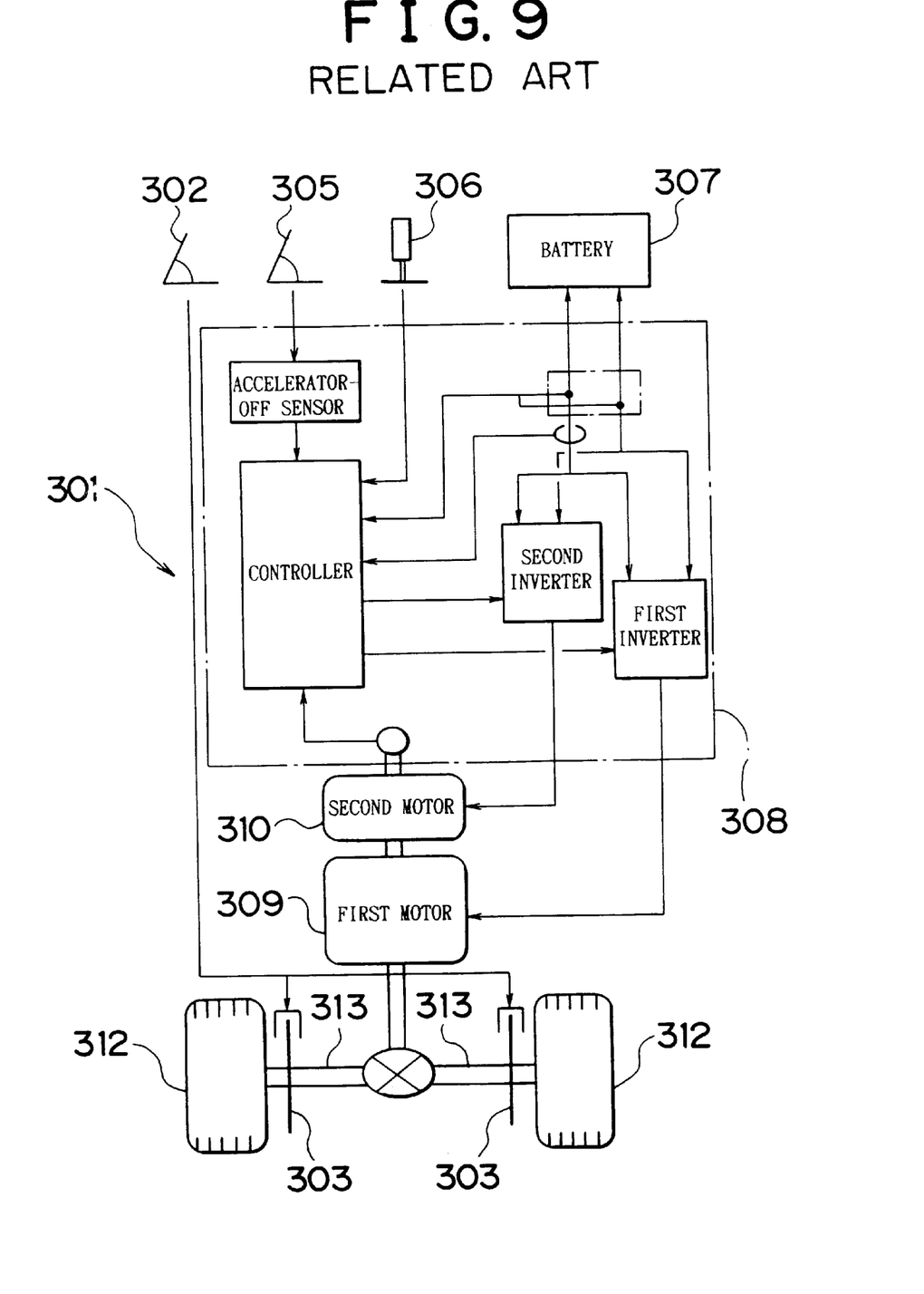
FIG. 9 is a block diagram of a related-art drive force control apparatus for an electric vehicle.

As a braking energy control apparatus for a vehicle equipped with an electric motor, an electric vehicle driving force control apparatus is disclosed in Japanese Patent Application Laid-Open No. HEI 7-99704. FIG. 9 shows a block diagram of an electric vehicle driving force control apparatus as disclosed in the laid-open patent application.

As shown in FIG. 9, the electric vehicle driving force control apparatus 301 includes a brake pedal 302, a plurality of brake mechanisms 303, an accelerator pedal 305, a regenerative braking force range switch lever 306, a battery 307, and a control device 308. On the basis of the amount of depression of the accelerator pedal 305 and the range position of the regenerative braking force range switch lever 306, the electric vehicle driving force control apparatus 301 causes the power operation of coaxially connected first and second electric motors 309, 310 through high-efficiency excitation, or causes the regenerative braking operation of the first and second motors 309, 310. When the brake pedal 302 is depressed, the electric vehicle driving force control apparatus 301 operates the brake mechanisms 303 using hydraulic circuits in accordance with the amount of depression of the brake pedal 302, so as to brake wheels 312 that are being rotated together with axles 313.

When the accelerator pedal 305 is depressed, the electric vehicle driving force control apparatus 301 power-drives the electric vehicle by driving the first and second AC motors 309, 310 on the basis of the DC current from the battery in accordance with the amount of depression of the accelerator pedal 305. When the accelerator pedal 305 is released from the depression to assume an off-state, the electric vehicle driving force control apparatus 301 detects a charged condition of the battery 307. If the battery 307 is in a chargeable condition, the electric vehicle driving force control apparatus 301 causes the first motor 309 and the second motor 310 to operate for regeneration. The power regenerated by the regenerative operation of the motors 309, 310 is stored into the battery 307. If the battery 307 is in a fully charged condition or in a nearly fully charged condition, the electric vehicle driving force control apparatus 301 causes either one of the first and second motors 309, 310 to operate for regeneration. By using the regenerated electric power, the electric vehicle driving force control apparatus 301 power-operates the other motor, thereby achieving regenerative braking, without charging the battery 307.

If the accelerator pedal is off or only slightly depressed while the brake pedal is off during the running of the vehicle, an appropriate amount of braking energy is needed. The related-art electric vehicle driving force control apparatus 301 obtains a certain amount of braking energy while the brake pedal is off, merely through the control wherein the off-state of the accelerator pedal is detected and then only a regenerative braking energy is applied. Therefore, the aforementioned related-art control apparatus has a problem that the achievable braking energy is limited to the amount of regenerative braking energy that can be achieved by the electric motors.

SUMMARY OF THE INVENTION

Accordingly, it is an object of the present invention to achieve a predetermined amount of braking energy while the brake pedal is off, without being restricted by the limit amount of regenerative braking energy that can be achieved by an electric motor unit, and achieving this regardless of the charged level of the battery.

According one aspect of the invention, there is provided a vehicle braking energy control apparatus including a regenerative energy control device that controls regenerative braking energy applied to a wheel of a vehicle by a motor, and a friction braking energy control device that controls friction braking energy regarding a brake; wherein the friction braking energy can be applied in addition to the regenerative braking energy when a brake pedal is off.

This vehicle braking energy control apparatus is able to apply friction braking energy by using the brake, in addition to regenerative braking energy achieved by using the motor, when a predetermined braking force is needed while the brake pedal is off. Normally, the amount of regenerative braking energy absorbable by using the motor varies depending on the charged condition of the battery. However, in this invention, if the amount of regenerative braking energy absorbable by using the motor is not sufficient to meet a required amount of braking energy, a supplemental amount of friction braking energy can be added by using the brake. Therefore, the control apparatus of the invention is able to reliably provide a required amount of braking energy, independently of the charged condition of the battery, and without being restricted by the limit of regenerative braking energy achievable by the motor.

The vehicle braking energy control apparatus of the invention may further include an engine braking energy control device that controls engine braking by an engine, wherein at least one of the friction braking energy and engine braking energy can be applied in addition to the regenerative braking energy when the brake pedal is off. This structure also achieves the advantage mentioned above.

According to another aspect of the invention, there is provided a vehicle braking energy control method wherein regenerative braking energy applied to a wheel of a vehicle by a motor is controlled; friction braking energy regarding a brake is controlled; and the friction braking energy is applied in addition to the regenerative braking energy when a brake pedal is off.

In this method, a predetermined braking energy may be set, and the regenerative braking energy may be supplemented with at least one of the friction braking energy and the engine braking energy to meet the predetermined braking energy when the brake pedal is off.

This vehicle braking energy control method is able to apply friction braking energy by using the brake, in addition to regenerative braking energy achieved by using the motor, when a predetermined braking force is needed while the brake pedal is off. Furthermore, since a maximum amount of regenerative braking energy is stored into the battery by using the motor, up to the capacity limit of the battery, it becomes possible to reduce the energy consumption needed to run the vehicle. Normally, the amount of regenerative braking energy absorbable by using the motor varies depending on the charged condition of the battery. However, in this invention, if the amount of regenerative braking energy absorbable by using the motor is not sufficient to meet a required amount of braking energy, a supplemental amount of friction braking energy based on the brake and/or engine braking energy can be added. Therefore, the control method of the invention is able to reliably provide a required amount of braking energy, independently of the charged condition of the battery, and without being restricted by the limit of regenerative braking energy achievable by the motor.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
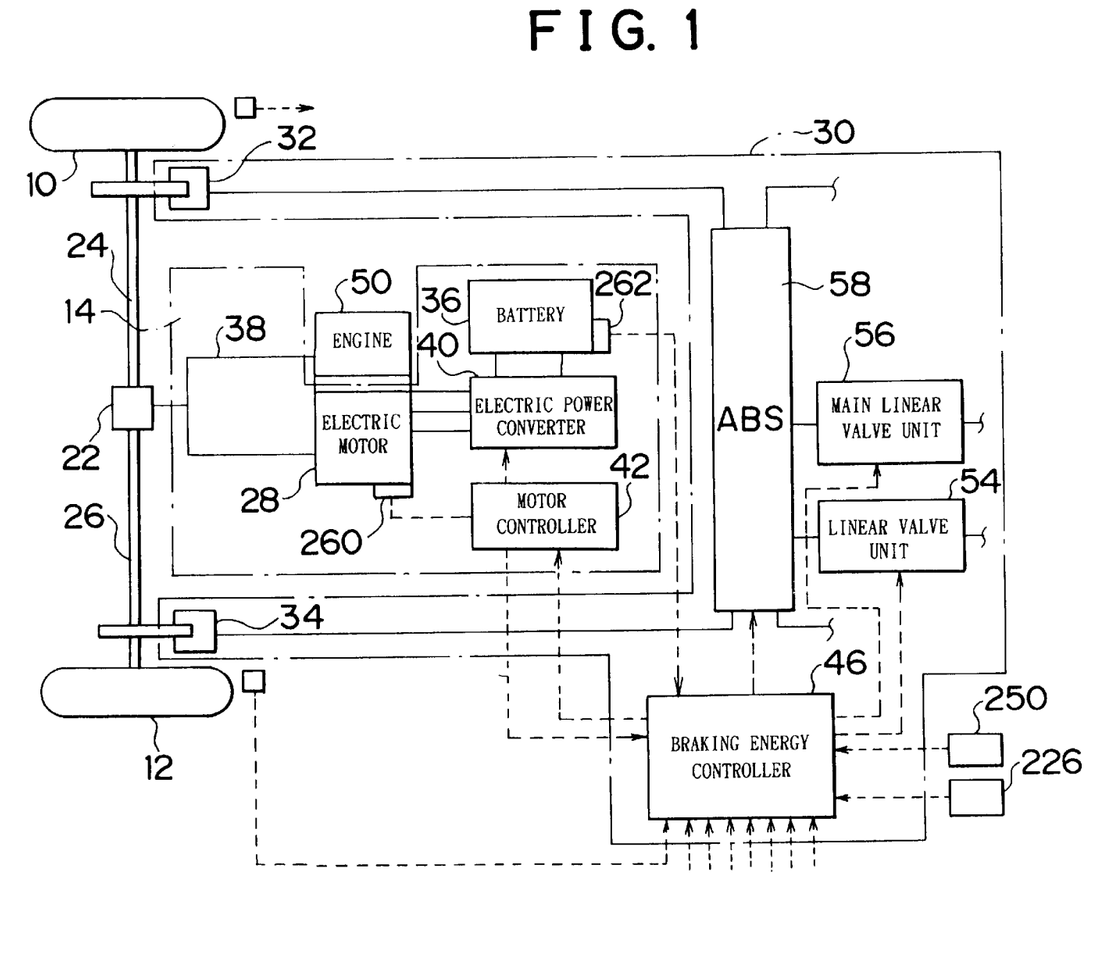
FIG. 1 is a block diagram of a vehicle braking energy control apparatus according to a first embodiment of the invention.

FIG. 1 shows a block diagram of a vehicular braking energy control apparatus according to a first embodiment of the invention. Although in FIG. 1, the vehicle is shown as a hybrid vehicle driven by an engine 50 and an electric motor 28, the first embodiment is not limited to hybrid vehicles. The first embodiment may also be applied to an electric vehicle driven solely by an electric motor, a vehicle that is driven solely by an engine and equipped with an electric motor for a purpose other than the driving of the vehicle, or the like.

In the vehicle illustrated in FIG. 1, front wheels 10, 12 serve as drive wheels. That is, the first embodiment of the invention is normally applied to a front engine-front drive (FF) vehicle. However, the invention may also be applied to a front engine-rear drive (FR) vehicle, a four-wheel drive vehicle, and the like.

As indicated in FIG. 1, the wheels 10, 12 receive a drive force from the engine 50 and the electric motor 28 selectively or in combination. More specifically, the drive force from the engine 50 and/or the electric motor 28 is transmitted, via a transmission 38, to a differential gear unit 22, and then divided into right and left axle shafts 24, 26 connected to the wheels 10, 12, respectively. An electrical drive device 14 is provided for controlling the drive force of the electric motor 28. The electrical drive device 14 also functions as a regenerative braking energy control device that applies regenerative braking energy to the wheels 10, 12 through braking energy regeneration by the electric motor 28. Hereinafter, the electrical drive device 14 will be referred to as "regenerative braking energy control device 14".

The vehicle is also equipped with a friction braking energy control device 30 for controlling the friction braking energy on the basis of liquid pressure. Brake pads provided as friction members are friction-engaged with rotors provided as brake rotating bodies that rotate together with the wheels 10, 12, by liquid pressure transmitted to wheel cylinders 32, 34, thereby braking the wheels 10, 12. That is, the combination of the friction braking energy achieved by the friction braking energy control device 30 and the regenerative braking energy achieved by the regenerative braking energy control device 14, that is, the total braking energy, is controlled and applied to the wheels 10, 12 by a braking energy controller 46, so as to reduce the rotation of the wheels 10, 12.

The regenerative braking energy control device 14 includes the electric motor 28, a battery 36, the transmission 38, an electric power converter 40, a motor controller 42, and the like. The electric motor 28 is supplied with AC current converted by the electric power converter 40 from DC current from the battery 36, to produce a drive force that drives the wheels 10, 12. Therefore, the vehicle is driven by only the drive force from the electric motor 28 or the engine 50 in some occasions, and, in other occasions, by a combination of drive force from the electric motor 28 and drive force from the engine 50. If, during the running of the vehicle, a state occurs where the rotating shaft of the electric motor 28 is forced to rotate by the wheels 10, 12, then the electric motor 28 produces a regenerative electromotive force. If the battery 36 is thereby charged, the electric motor 28 operates as a load and, therefore, provides a regenerative braking energy, so that a braking force is applied to the wheels 10, 12. The electric power converter 40 includes an inverter and the like. The electric power converter 40 is controlled by the motor controller 42. Through the current control by the inverter, the magnitude of the drive energy and regenerative braking energy achieved by the electric motor 28 is controlled, so that the drive force and braking force on the wheels 10, 12 can be controlled.

Figure 3:
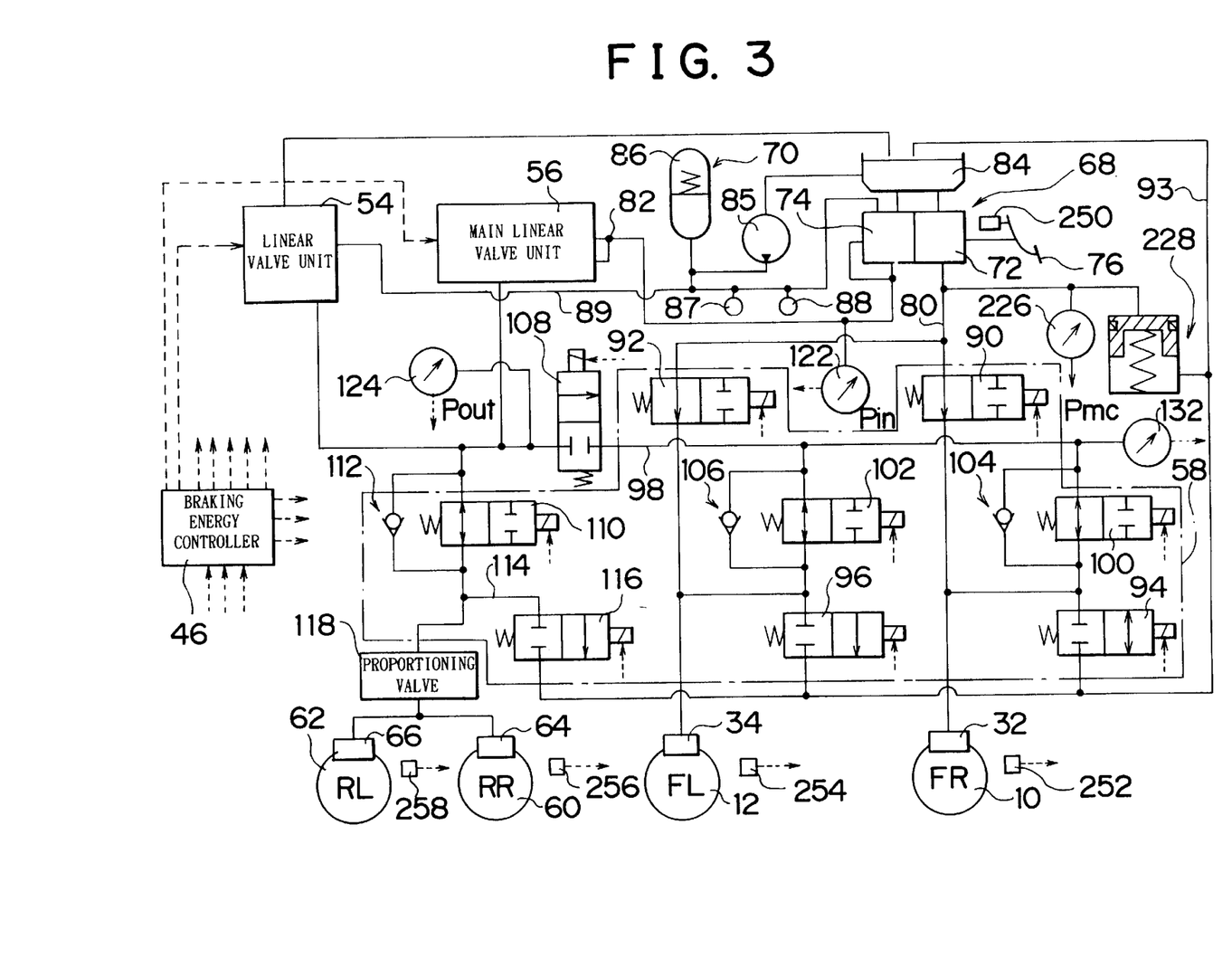
FIG. 3 is a circuit diagram of a friction braking energy control device included in the vehicle braking energy control apparatus shown in FIGS. 1 and 2.

The friction braking energy control device 30 includes the wheel cylinders 32, 34 of the wheels 10, 12, the braking energy controller 46, a main linear valve unit 56, a linear valve unit 54, and an antilock brake system (ABS) 58. The friction braking energy control device 30 further includes wheel cylinders 64, 66 of rear wheels 60, 62, a master cylinder 68, a constant liquid pressure source 70, and the like, as indicated in FIG. 3. The braking energy controller 46 performs ensemble control of braking energy through appropriate distribution thereof between regenerative braking energy and friction braking energy.

As indicated in FIG. 3, the master cylinder 68 has pressurizing chambers 72, 74 in each of which a liquid pressure is produced in accordance with the operating force on a brake pedal 76. Of the two pressurizing chambers, one pressurizing chamber 72 is connected to the wheel cylinders 32, 34 of the drive wheels 10, 12 via a liquid passage 80, and the other pressurizing chamber 74 is connected to the wheel cylinders 64, 66 of the rear wheels 60, 62, via a liquid passage 82, the main linear valve unit 56, and the linear valve unit 54. The constant liquid pressure source 70 includes a master reservoir 84, a pump 85, an accumulator 86, and the like. Operating liquid is drawn from the master reservoir 84 and stored into the accumulator 86 by the pump 85. The accumulator 86 has two pressure switches 87, 88 that detect a liquid pressure increase to or above an upper limit pressure in the accumulator 86 and a liquid pressure decrease to or below a lower limit pressure in the accumulator 86. The pump 85 is started or stopped in accordance with the turning on and off of the pressure switches 87, 88 with hysteresis, whereby an operating liquid pressure in the accumulator 86 is always maintained within a set pressure range. The constant liquid pressure source 70 is connected to the pressurizing chamber 74 of the master cylinder 68. In accordance with the depression of the brake pedal 76, operating liquid is supplied from the constant liquid pressure source 70 to the pressurizing chamber 74.

Changeover solenoid valves 90, 92 are provided in a part of the liquid passage 80. By opening and closing the changeover solenoid valves 90, 92, the wheel cylinders 32, 34 and the master cylinder 68 are interconnected in communication and shut off from each other. The wheel cylinders 32, 34 are shut off from the master cylinder 68 at the time of regenerative-friction braking energy coordinate control, antilock control or the like.

Changeover solenoid valves 94, 96 are provided as pressuring reducing valves, in a part of a liquid passage 93 connecting between the wheel cylinders 32, 34 and the master reservoir 84. When the changeover solenoid valves 94, 96 are opened, the wheel cylinders 32, 34 are connected in communication with the master reservoir 84, so that the liquid pressure in the wheel cylinders 32, 34 decreases and, therefore, the braking force based on liquid pressure decreases.

Changeover solenoid valves 100, 102 are provided as pressure increasing valves, in a part of a liquid passage 98 connecting the wheel cylinders 32, 34 to the main linear valve unit 56 and the linear valve unit 54. When the regenerative-friction braking force energy coordinate control is performed during normal braking or during the off-state of the brake pedal 76, the changeover solenoid valves 100, 102 are maintained in an open state so as to maintain the communication between the wheel cylinders 32, 34 and the combination of the main linear valve unit 56 and the linear valve unit 54. Check valves 104, 106 are provided in a part of bypasses extending around the solenoid valves 100, 102, respectively. The check valves 104, 106 allow operating liquid to flow from the wheel cylinders 32, 34 to the main linear valve unit 56 and the linear valve unit 54, but prevent operating liquid from flowing in the opposite direction. Therefore, when the brake pedal 76 is released from depression, the check valves 104, 106 cause operating liquid to quickly return from the wheel cylinders 32, 34. A changeover solenoid valve 108 is provided in a part of the liquid passage 98 connecting the main linear valve unit 56 and the linear valve unit 54 to the changeover solenoid valves 100, 102. The changeover solenoid valve 108 is opened, for example, at the time of the regenerative-friction braking force energy coordinate control, or the antilock control with respect to the wheels 10, 12.

The main linear valve unit 56 is disposed at a connecting portion between the liquid passage 82 and the liquid passage 98. The linear valve unit 54 is disposed at a connection portion between the liquid passage 89 from the constant liquid pressure source 70 and the liquid passage 98. A changeover solenoid valve 110 is provided as a pressure increasing valve between the wheel cylinders 64, 66 and the combination of the main linear valve unit 56 and the linear valve unit 54. A check valve 112 is provided in a bypass extending around the changeover solenoid valve 110. The check valve 112 allows operating liquid to flow from the wheel cylinders 64, 66 toward the main linear valve unit 56 and the linear valve unit 54, but prevents operating liquid from flowing in the opposite direction. A changeover solenoid valve 116 is provided as a pressure reducing valve in a part of a liquid passage 114 connecting between the wheel cylinders 64, 66 and the master reservoir 84. A proportioning valve 118 is provided between the changeover solenoid valve 110 and the wheel cylinders 64, 66. Due to the operation of the proportioning valve 118, the liquid pressure on the wheel cylinders 64, 66 of the rear wheels 60, 62 does not exceed the liquid pressure on the wheel cylinders 32, 34 of the front wheels 10, 12.

A liquid pressure sensor 122 is provided in a liquid passage 82 between the main linear valve unit 56 and the master cylinder 68. Another liquid pressure sensor 124 is provided between the changeover solenoid valve 108 and the combination of the main linear valve unit 56 and the linear valve unit 54. Still another liquid pressure sensor 132 is provided in a part of the liquid passage 98. The liquid pressure sensor 132 is provided to detect an abnormality of the liquid pressure sensor 124. If the output signal from the liquid pressure sensor 132 and the output signal from the liquid pressure sensor 124 greatly differ from each other while the changeover solenoid valve 108 is maintained in the open state, it is determined that the liquid pressure sensor 124 is abnormal.

Figure 4A:
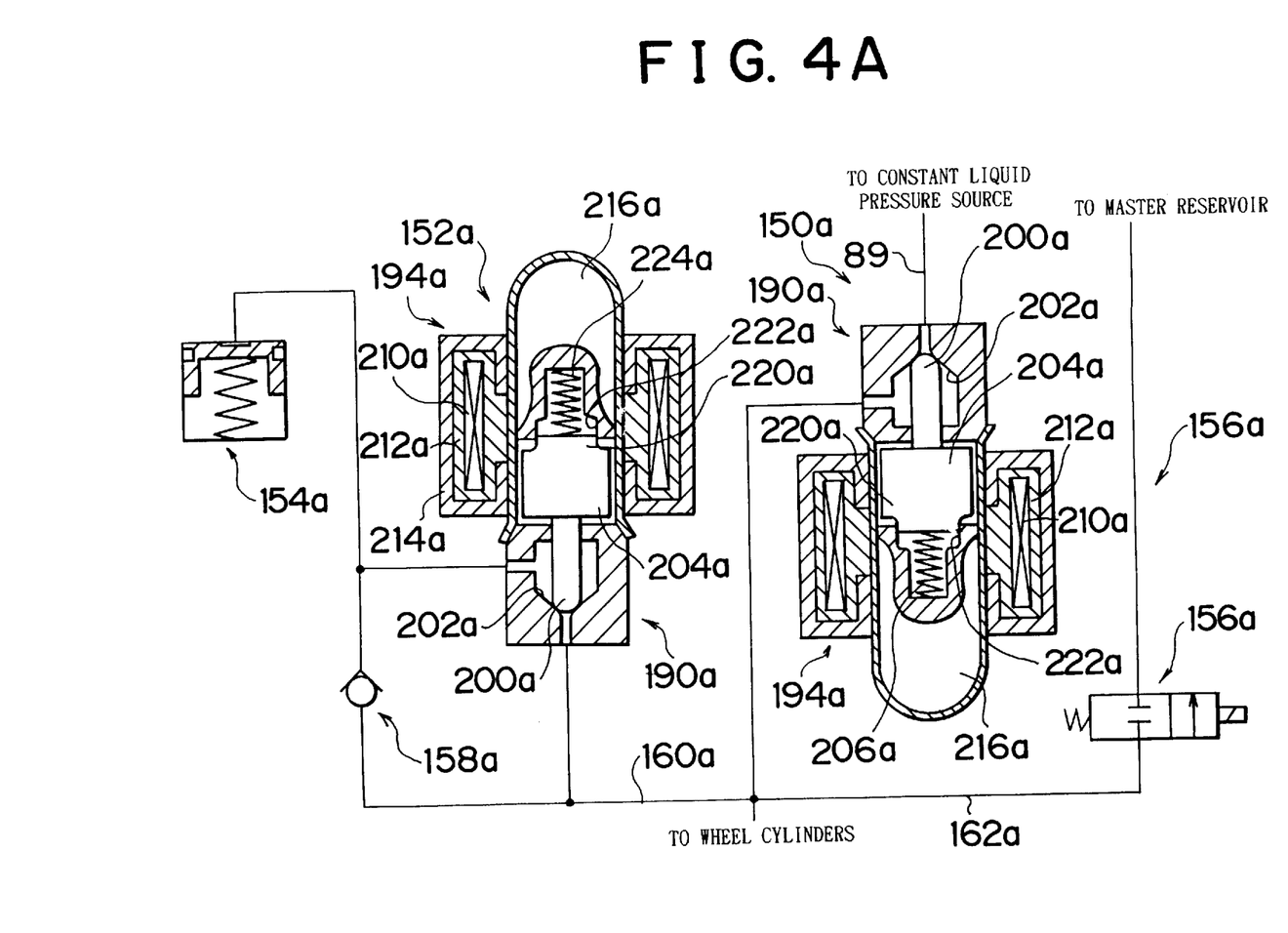
FIGS. 4A and 4B are partially sectional views of a linear valve unit and a main linear valve unit that are included in the friction braking energy control device shown in FIG. 3.
Figure 4B:
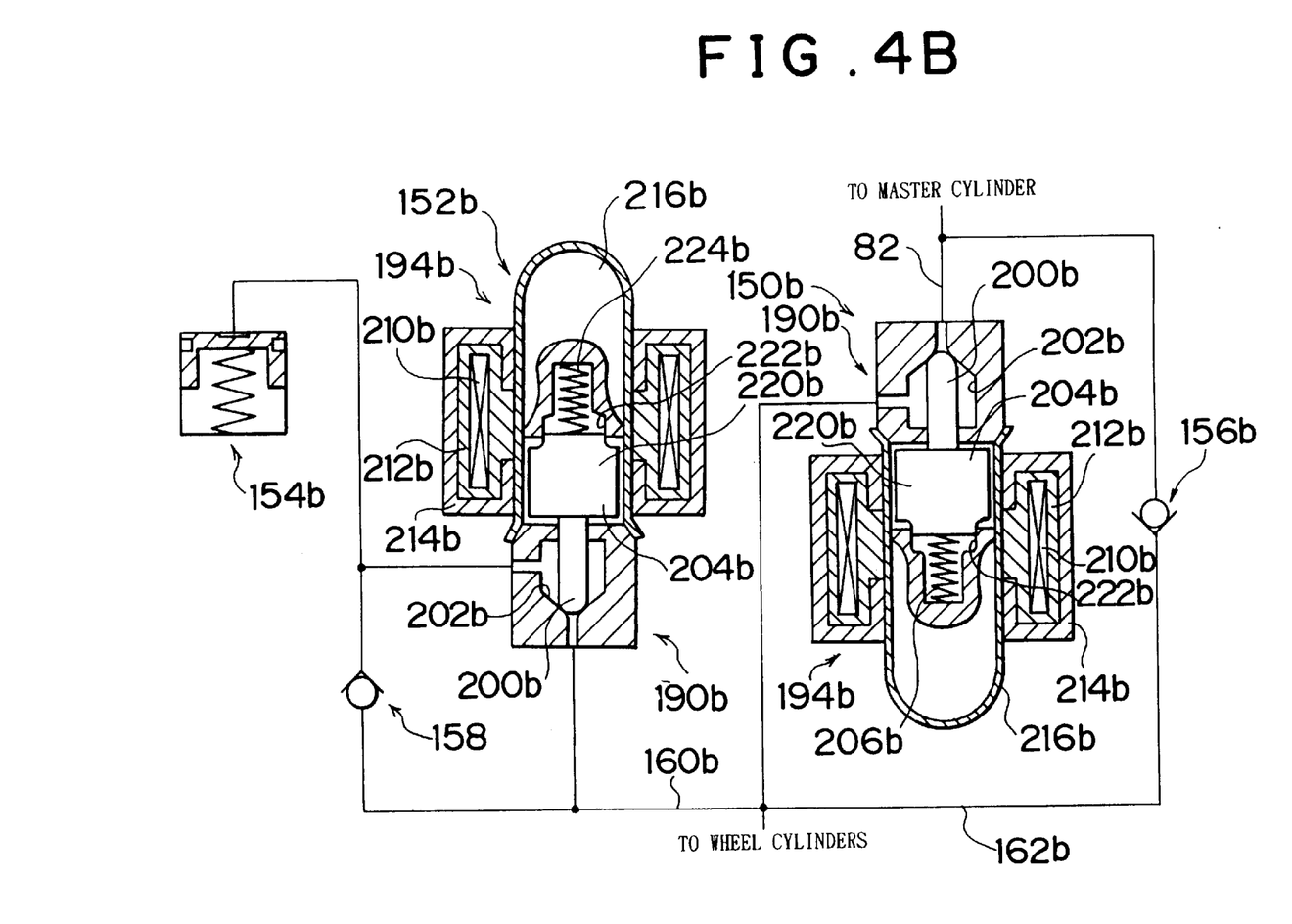

FIGS. 4A and 4B illustrate the linear valve unit 54 and the main linear valve unit 56, respectively. Since the two units have substantially the same construction and operate in substantially the same manner, the following description will be made mainly regarding the linear valve unit 54 illustrated in FIG. 4A. Components of the main linear valve unit 56 in FIG. 4B comparable to those of the linear valve unit 54 in FIG. 4A are represented by comparable reference numerals where the suffix "a" in FIG. 4A is replaced by "b" in FIG. 4B. The description of the main linear valve unit 56 will be limited to the features thereof that distinguish the main linear valve unit 56 from the linear valve unit 54.

A pressure reduction control valve of the linear valve unit 54 includes a pressure-increasing linear valve 150a provided as a pressure increase control valve, a pressure-reducing linear valve 152a provided as a pressure reduction control valve, a pressure-reducing reservoir 154a, a changeover solenoid valve 156a, and a check valve 158a. The pressure-increasing linear valve 150a is connected to the liquid passage 89 extending from the constant liquid pressure source 70. The pressure-reducing linear valve 152a is disposed in a part of a liquid passage 160a connecting between the pressure-increasing linear valve 150a and the pressure-reducing reservoir 154a. The liquid passage 160a is also connected to the wheel cylinder side. The changeover solenoid valve 156a is disposed in a part of a liquid passage 162a extending to the master reservoir 84. Normally, the changeover solenoid valve 156a prevents operating liquid from flowing from the pressure-reducing reservoir 154a toward the master reservoir 84. However, when the voltage applied to the pressure-increasing linear valve 150a is reduced to 0, the changeover solenoid valve 156a is immediately switched to allow operating liquid to flow from the pressure-reducing reservoir 154a toward the master reservoir 84, thereby reducing the liquid pressure from the pressure-reducing reservoir 154a. The check valve 158a is disposed in a part of a bypass extending around the pressure-reducing linear valve 152a. The check valve 158a allows operating liquid to flow from the pressure-reducing reservoir 154a toward the changeover solenoid valve 156a, and prevents operating liquid from flowing in the opposite direction.

The pressure-increasing linear valve 150a is substantially made up of a seating valve 190a and an electromagnetic drive device 194a. The seating valve 190a includes a valve 200a, a valve seat 202a, an electromagnetically driven member 204a movable together with the valve 200a, and a spring 206a that urges the electromagnetically driven member 204a in such a direction as to seat the valve 200a on the valve seat 202a. The electromagnetic drive device 194a includes a solenoid 210a, a resin-made retaining member 212a that retains the solenoid 210a, a first magnetic path forming member 214a, and a second magnetic path forming member 216a. When a voltage is applied to the two ends of the winding of the solenoid 210a to drive a current through the winding, a magnetic field is produced. If the voltage applied to the winding of the solenoid 210 is varied, the magnetic force between the electromagnetically driven member 204a and the second magnetic path forming member 216a varies. A fitting protruded portion 220a is formed at an end of the electromagnetically driven member 204a, the end facing the second magnetic path forming member 216a. A fitting hole 222a is formed at an end of the second magnetic path forming member 216a, the end facing the electromagnetically driven member 204a, in such a manner that the fitting hole 222a fits to the fitting protruded portion 220a of the electromagnetically driven member 204a movably relative to each other in the direction of the axis of the hole and the protruded portion. The spring 206a is disposed in the fitting hole 222a.

When a voltage is applied to the solenoid 210a, a magnetic path is formed, extending from the solenoid 210a, through the first magnetic path forming member 214a, the electromagnetically driven member 204a, the second magnetic path forming member 216a and the first magnetic path forming member 214a, back to the solenoid 210a. The magnetic resistance of the magnetic path between the electromagnetically driven member 204a and the second magnetic path forming member 216a varies depending on the position of the electromagnetically driven member 204a relative to the second magnetic path forming member 216a in the direction of the axis. More specifically, if the position of the electromagnetically driven member 204a and the second magnetic path forming member 216a relative to each other in the direction of the axis varies, a change occurs in the area of a portion of the cylindrical surface of the fitting protruded portion 220a (a portion of the outer peripheral surface thereof) of the electromagnetically driven member 204a and a portion of the cylindrical surface of the fitting hole 222a (a portion of the inner peripheral surface thereof) of the second magnetic path forming member 216a that face each other over a small gap therebetween (that is, an overlapping surface area). If the end surface of the electromagnetically driven member 204a and the end surface of the second magnetic path forming member 216a faced each other with a small interval therebetween, the magnetic resistance would acceleratingly decrease and, therefore, the magnetic force between the electromagnetically driven member 204a and the second magnetic path forming member 216a would acceleratingly increase, in accordance with decreases in the distance between the electromagnetically driven member 204a and the second magnetic path forming member 216a in the direction of axis, that is, in accordance with their approach toward each other. However, in the pressure-increasing linear valve 150a of this embodiment, as the electromagnetically driven member 204a approaches the second magnetic path forming member 216a, the area of overlapping peripheral surfaces of the fitting protruded portion 220a and the fitting hole 222a increases so that the magnetic flux passing through the overlapping peripheral surfaces increases, and the magnetic flux passing through the air gap between the end surface of the electromagnetically driven member 204a and the end surface of the second magnetic path forming member 216a decreases. Therefore, if the voltage applied to the solenoid 210a remains constant, the magnetic force that urges the electromagnetically driven member 204a toward the second magnetic path forming member 216a remains substantially constant, regardless of the movement of the electromagnetically driven member 204a and the second magnetic path forming member 216a relative to each other in the direction of the axis. On the other hand, the force that urges the electromagnetically driven member 204a away from the spring 206a increases as the electromagnetically driven member 204a approaches the second magnetic path forming member 216a. Therefore, while the valve 200a does not receive a force based on a liquid pressure difference, the movement of the electromagnetically driven member 204a toward the second magnetic path forming member 216a stops when the force from the spring 206a equals the magnetic force.

The magnitude of the magnetic force that urges the electromagnetically driven member 204a to approach the second magnetic path forming member 216a increases with increases in the voltage applied to the winding of the solenoid 210a. The relationship between the voltage applied and the magnetic force produced can be determined beforehand. Therefore, the force that urges the electromagnetically driven member 204a can be changed as desired, by continuously changing the applied voltage in accordance with the relationship. An increase in the applied voltage increases the magnetic force and therefore reduces the force in such a direction as to press the valve 200a against the valve seat 202a, so that it becomes easier to separate the valve 200a from the valve seat 202a. When the force acting on the valve 200a on the basis of the differential pressure of operating liquid thereon (the difference between the liquid pressure in the liquid passage 89 and the liquid pressure in the liquid passage 160) exceeds the force that acts on the electromagnetically driven member 204a (the resultant force of the magnetic force and the force by the spring 206a), the valve 200a separates from the valve seat 202a. Therefore, by increasing the applied voltage, the pressure-increasing linear valve 150a can be opened even if the differential pressure is small. The required valve opening pressure is thereby reduced, and the pressure of liquid flowing through the liquid passage 160a increases (that is, the differential pressure decreases).

The pressure-reducing linear valve 152a is basically the same as the pressure-increasing linear valve 150a. That is, an increase in the voltage applied to the pressure-reducing linear valve 152a reduces the pressure needed to open the pressure-reducing linear valve 152a and, therefore, reduces the liquid pressure in the liquid passage 160a. Components and portions of the pressure-reducing linear valve 152a comparable to those of the pressure-increasing linear valve 150a are represented by comparable reference characters in FIG. 4A, and will not be described again.

In the friction braking energy control device 30 of this embodiment, the maximum pressure of operating liquid supplied to the pressure-reducing linear valve 152a is the maximum liquid pressure that is supplied by the pump 85 or stored in the accumulator 86. Therefore, it does not practically occur that the pressure of operating liquid exceeds the maximum liquid pressure so that operating liquid flow s out into the pressure-reducing reservoir 154a, via the pressure-reducing linear valve 152a. The amount of operating liquid stored in the pressure-reducing reservoir 154a is returned to the master reservoir 84, via the check valve 158a, the liquid passage 160a, the liquid passage 162a, and the changeover solenoid valve 156a, after operation.

The liquid passage 80 is provided with a liquid pressure sensor 226, as shown in FIG. 3, for detecting the liquid pressure in the master cylinder 68. Furthermore, the liquid passage 80 is provided with a stroke simulator 228 that prevents occurrence of an event that when the changeover solenoid valves 90, 92 are both closed, the brake pedal 76 cannot be depressed and, therefore, there is substantially no stroke. The brake pedal 76 is provided with a brake switch 250 for detecting a depression of the brake pedal 76. Wheel speed sensors 252, 254, 256, 258 are provided for detecting the rotating speed of the wheels 10, 12, 60, 62, respectively. Based on the output signals from these sensors, a braking slipping state or estimated vehicle speed can be detected.

The voltage applied to one of the solenoid 210a of the pressure-increasing linear valve 150a and the solenoid 210a of the pressure-reducing linear valve 152a in the linear valve unit 54 is determined so that the liquid pressure detected by the liquid pressure sensor 124 becomes equal to a liquid pressure that provides a friction braking energy described later. When the voltage applied to the solenoid 210a of the pressure-increasing linear valve 150a is increased so that the valve 200a and the valve seat 202a are separated far from each other, the liquid pressure detected by the liquid pressure sensor 124 increases. In contrast, an increase in the voltage applied to the solenoid 210a of the pressure-reducing linear valve 152a reduces the liquid pressure detected by the liquid pressure sensor 124.

With the structure of the linear valve unit 54 as described above, the braking energy controller 46 is advantageously able to substantially linearly change the liquid pressure to be supplied to the wheel cylinders 32, 34, 64, 66, by outputting an instruction to the friction braking energy control device 30 so as to control the voltage applied to the linear valve unit 54 in a suitable manner.

The main linear valve unit 56 will now be briefly described with reference to FIG. 4B. The main linear valve unit 56 differs from the linear valve unit 54 in that the pressure-increasing linear voltage 150b is connected to the liquid passage 82 extending from the master cylinder 68, and in that the liquid passage 160b and the returning liquid passage 162b from the wheel cylinder side are connected to the liquid passage 82, via a check valve 156b. The check valve 156b prevents operating liquid from the master cylinder 68 through the liquid passage 82 from flowing toward the wheel cylinders, but allows operating liquid to flow in the opposite direction. Therefore, after a braking operation based on liquid pressure ends, the amount of operating liquid in stored in the pressure-reducing reservoir 154b is returned to the master reservoir 84, via the check valve 158b, the liquid passage 160b, the liquid passage 162b, the check valve 156b, the liquid passage 82 and the master cylinder 68.

The braking energy controller 46 and the motor controller 42 are mainly formed by a computer equipped with a read-only memory (ROM), a random access memory (RAM), a processing unit (PU) and the like. An input portion of the braking energy controller 46 is connected to the liquid pressure sensors 122, 124, 226, a charged-condition detector 262 for detecting a charge capacity of the battery 36, and the like. An output portion of the braking energy controller 46 is connected to the changeover solenoid valves 90, 92, 94, 96, 100, 102, 108, 110, 116, the solenoids 210a, 210b of the linear valve unit 54 and the main linear valve unit 56, and the like, via circuits (not shown). The ROM scores a regenerative-friction braking energy coordinate control program illustrated by the flowchart of FIG. 5 and, furthermore, a coordinate control permission determining program for determining whether to perform the regenerative-friction braking energy coordinate control on the basis of the charged condition of the battery 36.

An input portion of the motor controller 42 is connected to an encoder 260 for detecting the rotational speed of the electric motor 28, an accelerator pedal depressed condition detector (not shown) for detecting a depressed condition of the accelerator pedal, and the like. An output portion of the motor controller 42 is connected to the electric power converter 40. The electric power converter 40 is controlled so that a drive force is provided in accordance with the depressed condition of the accelerator pedal, or so that a required regenerative braking energy is provided. As for the information exchange between the motor controller 42 and the braking energy controller 46, the braking energy controller 46 supplies the motor controller 42 with information representing required regenerative braking energy, information as to whether to allow the regenerative braking energy control to be performed, and the like. The motor controller 42 supplies the braking energy controller 46 with information representing actually-applied regenerative braking energy.

In the vehicle braking energy control apparatus as described above, when the brake pedal 76 is depressed, braking energy including at least one of friction braking energy and regenerative braking energy is applied to the wheels 10, 12, 60, 62. More specifically, the drive wheels 10, 12 receive at least regenerative braking energy, whereas the non-drive wheels 60, 62 do not receive regenerative braking energy , but receive only friction braking energy. In this invention, when the brake pedal is off, the braking energy control apparatus performs control such that at least regenerative braking energy is applied and a supplemental amount of friction braking energy based on liquid pressure is added, in order to achieve a predetermined amount of braking energy set on the basis of the vehicle speed and the depressed condition of the accelerator pedal (not shown). This control will be described in detail below.

Figure 5:
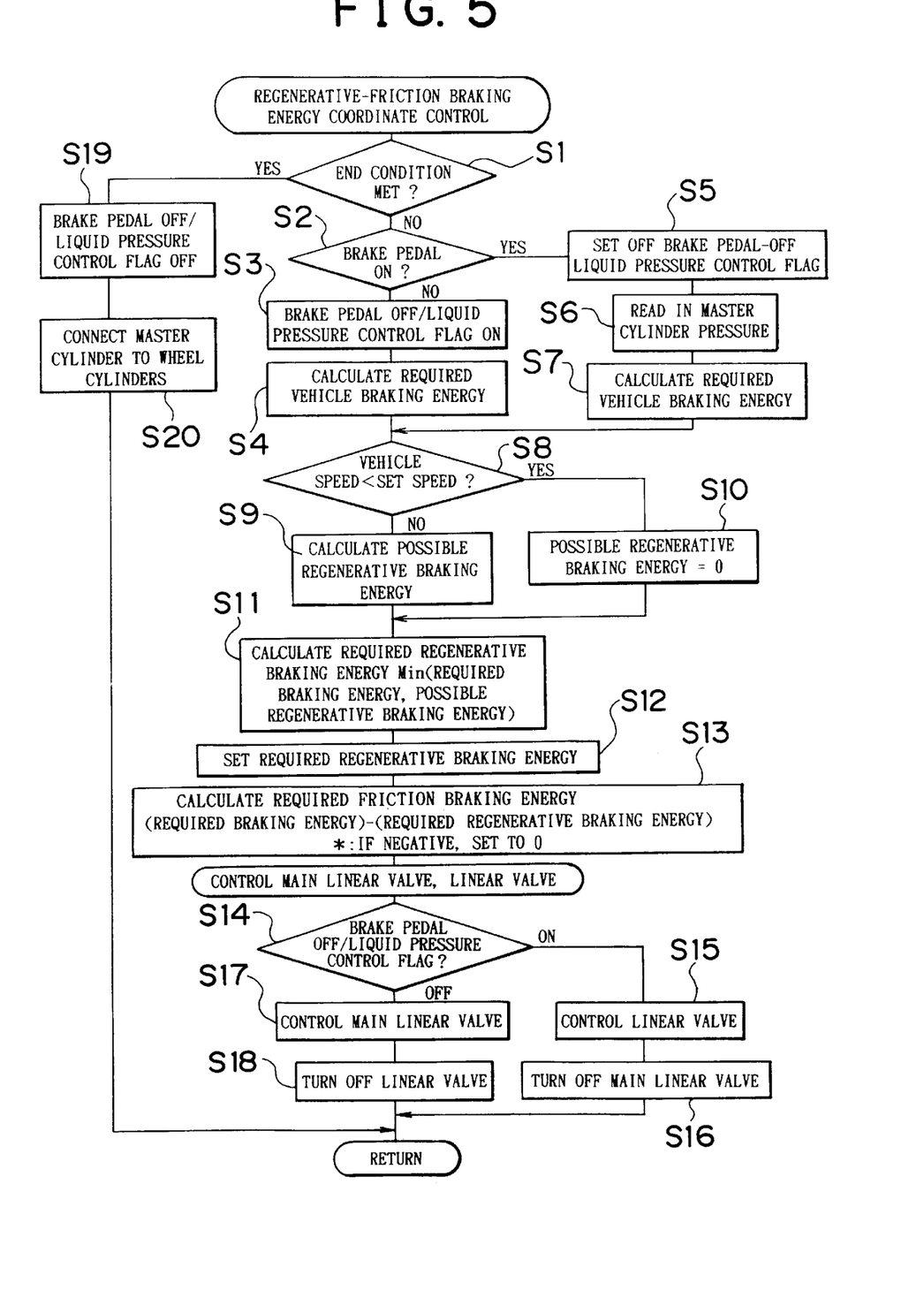
FIG. 5 is a flowchart illustrating a portion of a regenerative-friction braking force energy coordinate control program stored in a ROM of a braking energy control device included in the vehicle braking energy control apparatus according to the first embodiment.

The flowchart of FIG. 5 illustrates the flow of the regenerative-friction braking energy coordinate control performed by the vehicle braking energy control apparatus according to the first embodiment. In step S1, it is determined whether the condition for ending the regenerative-friction braking energy coordinate control is met. If the condition is not met, operation proceeds to step S2 to continue the control. In step S2, it is determined whether the brake pedal 76 is depressed (brake switch is on). If the brake switch is off, operation proceeds to step S3, where an instruction is outputted to set a brake pedal-off liquid control flag to an on-status. As a result, the changeover solenoid valves 90, 92 are turned on, and the circuit directly connecting between the master cylinder 68 and the wheel cylinders 32, 34 is shut down. Subsequently in step S4, a required braking energy, that is, an amount of braking energy that is needed on the basis of the present vehicle speed, is calculated and set on the basis a pre-set value.

Subsequently in step S8, it is determined whether the vehicle speed is less than a set speed. If the vehicle speed is not less than the set speed, which means that the rotation speed of the electric motor 28 is not less than a set rotation speed, it is possible to utilize regenerative braking energy. Therefore, operation proceeds to step S9, where a possible regenerative braking energy is calculated. Conversely, if the vehicle speed is less than the set speed, operation proceeds to step S10, where an amount of braking energy that can be regenerated is set to 0. This is because a rotation speed of the electric motor 28 less than the set speed leads to a very small amount of regenerative braking energy that can be absorbed or to great fluctuation thereof, so that suitable control of the magnitude of regenerative braking energy becomes impossible.

If the vehicle speed is not less than the set speed, operation proceeds to step S9, where a possible regenerative braking energy is calculated. The possible regenerative braking energy is an upper limit of the regenerative braking energy based on the capacity of the electric motor 28, and it is also dependent on the charged condition of the battery 36. After calculation of a possible regenerative braking energy, operation proceeds to step S11. In step S11, a required regenerative braking energy is calculated on the basis of the required braking energy set in step S4. If the battery 36 is in the fully charged condition or a nearly fully charged condition, an amount of regenerative braking energy corresponding to the capacity of the electric motor 28 cannot be absorbed, but the absorbable regenerative braking energy is limited by the battery 36. Therefore, an achievable value of regenerative braking energy is determined on the basis of a detected charged condition of the battery 36, with reference to a regenerative braking limit map. If the required braking energy set in step S4 is less than the possible regenerative braking energy, there is no need to absorb the limit amount of regenerative braking energy. Therefore, the required regenerative braking energy is set to the smaller value of the value of required vehicle braking energy and the value of possible regenerative braking energy, as indicated in step S11. This information is supplied to the motor controller 42.

After calculation of the required regenerative braking energy, operation proceeds to step S12, where a required regenerative braking energy is set. Subsequently in step S13, a friction braking energy is calculated. A friction braking energy is obtained by subtracting the required regenerative braking energy set in step S12 from the required vehicle braking energy. However, if the calculated friction braking energy is a negative value, that is, if the required regenerative braking energy is greater than the required braking energy, the regenerative braking energy by the electric motor 28 is sufficient for the braking operation and there is no need to use friction braking energy based on liquid pressure. Therefore, if the calculated friction braking energy is a negative value, the required friction braking energy is set to 0.

After the required regenerative braking energy and the required friction braking energy are set in this manner, the main linear valve unit 56 and the linear valve unit 54 are controlled. In step S14, it is determined whether the brake pedal-off liquid pressure control flag is on. Since the flag was set to the on-status in step S3, operation proceeds from step S14 to step S15. In step S15, the linear valve unit 54 is controlled. That is, a voltage in accordance with the required friction braking energy is applied to the pressure-increasing linear valve 150a and the pressure-reducing linear valve 152a shown in FIG. 4A, so as to produce a liquid pressure corresponding to the applied voltage, as described above. The liquid pressure is supplied to the rear wheel cylinders 64, 66, and to the front wheel cylinders 32, 34 via the changeover solenoid valve 108, thereby applying the friction braking energy to the wheels. In step S16, the main linear valve unit 56 is turned off. That is, the wheel cylinders receive the liquid pressure only from the linear valve unit 54. As understood from the foregoing description, when the brake pedal is not depressed, the coordinate control combining regenerative braking energy based on the electric motor 28 and friction braking energy based on liquid pressure is performed.

If it is determined in step S2 that the brake pedal is on, that is, depressed, operation proceeds to step S5, where the brake pedal-off liquid pressure control flag is set to an off-status. Subsequently in step S6, the liquid pressure in the master cylinder 68 is read in. In step S7, based on the liquid pressure in the master cylinder 68, the requirement degree of the braking energy required by a driving person is determined, and a required vehicle braking energy is calculated. Then, operation proceeds to step S8 and the later steps, that is, the same process as performed when the brake pedal is off. The process up to the control of the main linear valve unit 56 or the linear valve unit 54 is the same as described above. In step S14, it is determined that the brake pedal-off liquid pressure control flag is off. Then, operation proceeds to step S17.

In this case, that is, the case where the brake pedal-off liquid pressure control flag is off, the main linear valve unit 56 is controlled in step S17. A voltage in accordance with the required friction braking energy is applied to the pressure-increasing linear voltage 150b and the pressure-reducing linear valve 152b shown in FIG. 4B, so as to produce a corresponding liquid pressure. The liquid pressure is applied to the rear wheel cylinders 64, 66, and to the front wheel cylinders 32, 34 via the changeover solenoid valve 108, thereby applying the friction braking energy to the wheels. In step S18, the linear valve unit 54 is turned off. In short, when the brake pedal 76 is depressed (on), the coordinate control combining regenerative braking energy based on the electric motor 28 and friction braking energy based on liquid pressure is performed in accordance with the degree of depression of the brake pedal 76.

If it is determined in step S1 that the ending condition is met, operation proceeds to step S19, where the brake pedal-off liquid pressure control flag is set to the off-status. Subsequently in step S20, the master cylinder 68 is connected to the wheel cylinders 32, 34. Therefore, the coordinate control ends, and control based on liquid pressure in accordance with the depression of the brake pedal 76 is performed.

The ending condition employed in step S1 is a condition that there is a failure or abnormality in various devices such as the solenoids 210a, 210b, the liquid pressure sensors 122, 124, 132, and the like, or a condition that a drive torque occurs on the axle shafts 24, 26. If such an ending condition is met, the coordinate control is not performed.

Figure 7:
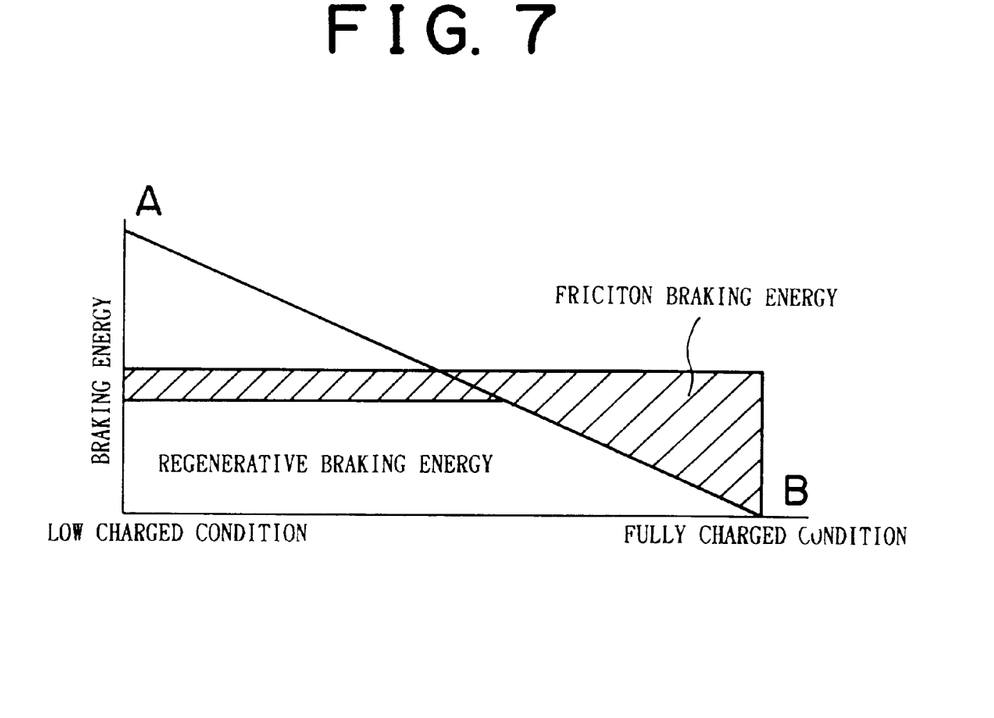
FIG. 7 is a graph indicating the distribution of braking energy between regenerative braking energy and friction braking energy in accordance with the charged condition of a battery in the vehicle braking energy control apparatus according to the first embodiment.

FIG. 7 is a graph indicating the distribution between regenerative braking energy and friction braking energy in the control apparatus and method of the first embodiment. In the graph, the abscissa axis indicates the charged condition of the battery 36, and the ordinate axis indicates the braking energy. As indicated in the graph, the upper limit of the regenerative braking energy varies in accordance with the charged condition of the battery 36. The upper limit values are on a line segment AB connecting zero (point B) where the battery 36 is in the fully charged condition and the energy value (point A) where the battery 36 is in the least charged condition. Therefore, when the charged condition of the battery 36 is at a low level, most of the required vehicle braking energy is provided as regenerative braking energy. As the charged condition of the battery 36 approaches the fully charged condition, the proportion of regenerative braking energy to the required vehicle braking energy decreases while the proportion of friction braking energy increases to meet the required vehicle braking energy.

Although in the calculation of a required regenerative braking energy in step S11 of the regenerative-friction braking force energy coordinate control, the regenerative braking energy is set to as large a value as possible within a range where the regenerative braking energy does not exceed the required vehicle braking energy. This processing is not restrictive, that is, it is also possible to omit the use of the maximum value achievable by the electric motor 28. Such a modified processing manner advantageously increases the freedom in control. On the other hand, the control method illustrated in FIG. 5, where the possible (maximum) regenerative braking energy achievable by the electric motor 28 is used, maximizes the amount of power that is regenerated by the electric motor 28 and stored into the battery 36, thereby achieving an advantage of reducing the energy consumption of the vehicle.

Either one of the first embodiment and the aforementioned modification advantageously provides a predetermined amount of braking energy regardless of the charged condition of the battery 36, without requiring an electric motor other than the electric motor 28. Furthermore, the control method of the vehicle braking energy control apparatus according to the first embodiment advantageously supplements the regenerative braking energy with friction braking energy if the required amount of braking energy is greater than the maximum value of regenerative braking energy achievable by the electric motor 28. Further, the first embodiment uses not only regenerative braking energy but also friction braking energy based on liquid pressure, an amount of braking energy required can reliably and immediately be provided without being restricted by the upper limit of regenerative braking energy achievable by the electric motor 28.

A vehicle braking energy control apparatus according to a second embodiment of the invention will be described. The second embodiment utilizes the engine braking effect. The second embodiment may be applied to a vehicle driven solely by an engine, a hybrid vehicle driven by a combination of an engine and an electric motor, and the like. As shown in the schematic diagram in FIG. 2, various components and devices of the control apparatus of the second embodiment are basically the same as those of the control apparatus of the first embodiment shown in FIG. 1.

Figure 2:
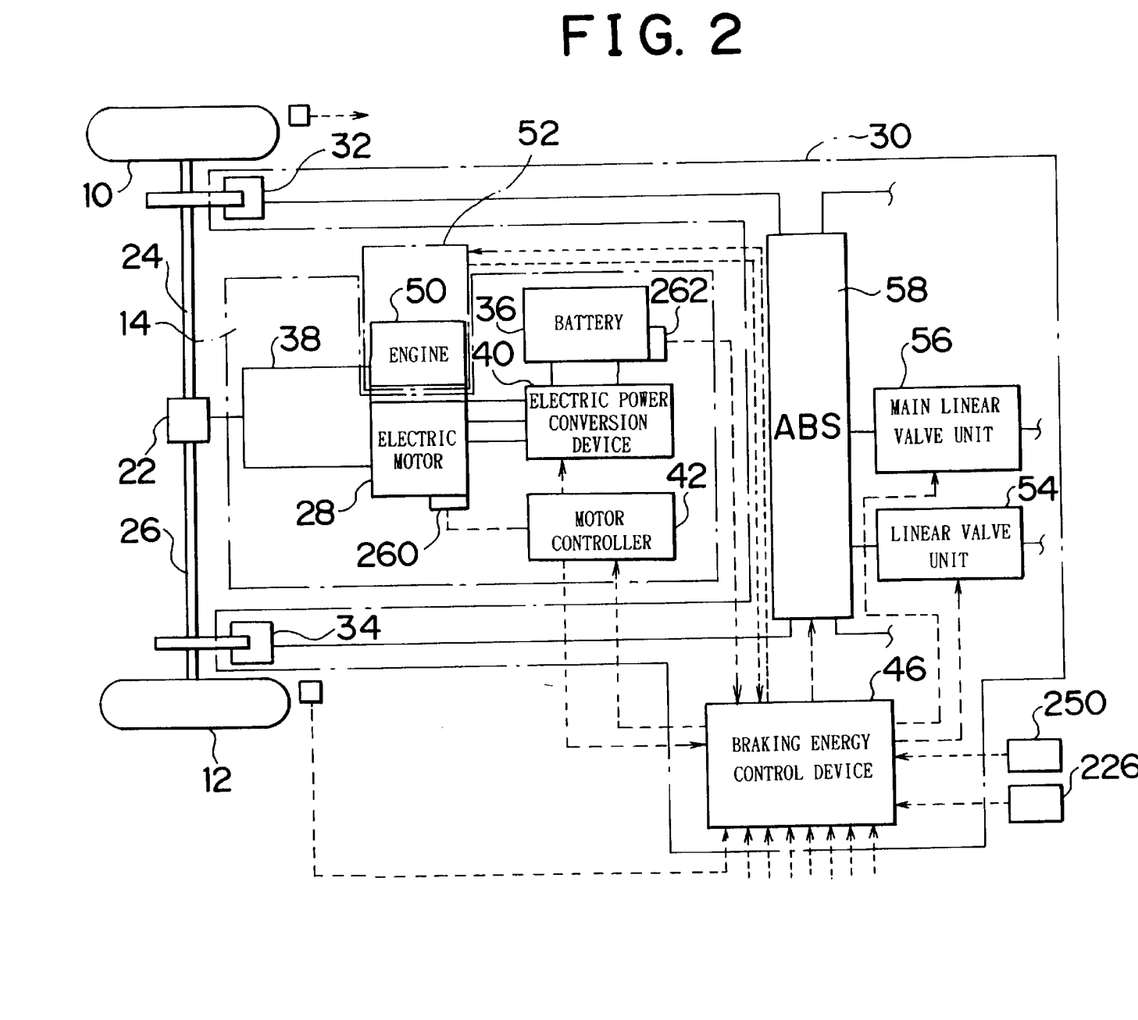
FIG. 2 is a block diagram of a vehicle braking energy control apparatus according to a second embodiment of the invention.

The second embodiment differs from the first embodiment in that an engine braking energy control device 52 is provided for controlling an engine 50. Signals from the engine braking energy control device 52 are transmitted to a braking energy controller 46. Signals from the braking energy controller 46 are sent to the engine braking energy control device 52 so as to control the engine 50. The circuit construction of a friction braking energy control device 30 included in the vehicle braking energy control apparatus of the second embodiment is substantially the same as the corresponding circuit construction of the first embodiment illustrated in FIG. 3, and will not be described again. The control method of the vehicle braking energy control apparatus of the second embodiment will be described with reference to the flowchart of FIG. 6.

Figure 6:
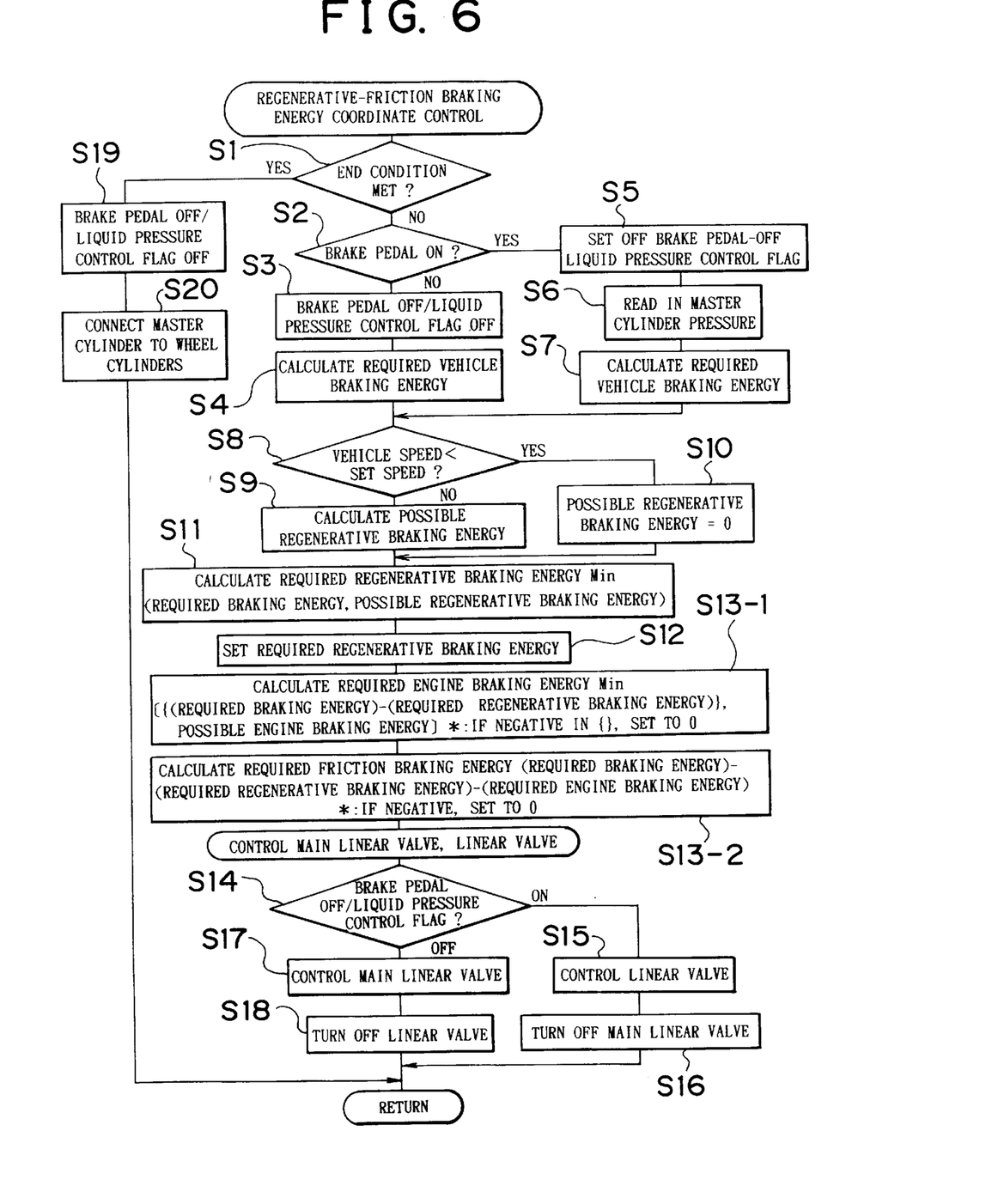
FIG. 6 is a flowchart illustrating a portion of a regenerative-friction braking force energy coordinate control program stored in a ROM of a braking energy control device included in the vehicle braking energy control apparatus according to the second embodiment.

The flowchart of FIG. 6 illustrates a regenerative-friction braking force energy coordinate control according to the second embodiment, wherein the processings in many steps are substantially the same as those illustrated in FIG. 5. The regenerative-friction braking force energy coordinate control according to the second embodiment differs from the control according to the first embodiment in that step S13 is replaced by steps S13-1 and S13-2. Steps S13-1 and S13-2 will mainly be described below. After a required regenerative braking energy is set in step S12, operation proceeds to step S13-1. In step S13-1, the required regenerative braking energy is subtracted from the required braking energy. The calculation result value is compared with a possible engine braking energy, and the smaller value is set as a required engine braking energy. If the required regenerative braking energy is greater than the required braking energy, the calculation result value is set to 0. Subsequently in step S13-2, a required friction braking energy is calculated. That is, an energy value obtained by subtracting the required regenerative braking energy and the required engine braking energy from the required braking energy is set as a required friction braking energy. If the required friction braking energy is a negative value, the required friction braking energy is set to 0.

The thus-determined values are outputted as instructions from the braking energy controller 46 to the regenerative braking energy control device 14, the engine braking energy control device 52 and the friction braking energy control device 30, so as to control the linear valve unit 54 and the main linear valve unit 56.

Figure 8:
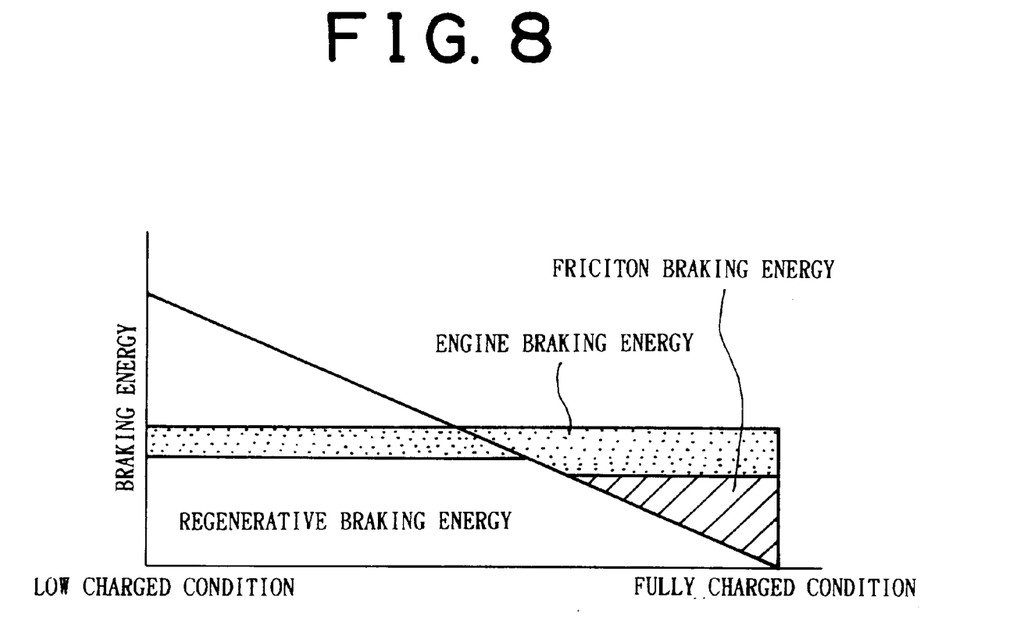
FIG. 8 is a graph indicating the distribution of braking energy among regenerative braking energy, engine braking energy and friction braking energy in accordance with the charged condition of a battery in the vehicle braking energy control apparatus according to the second embodiment.

The coordinate control illustrated in FIG. 6 is represented in the graph of FIG. 8, where the abscissa axis indicates the charged condition of the battery 36 and the ordinate axis indicates the braking energy. When the charged condition of the battery 36 is at a low level, most of the required braking energy is provided as regenerative braking energy, and engine braking energy is used as a supplement to meet the required braking energy. When the battery 36 is in the fully charged condition or a nearly fully charged condition, the amount of regenerative braking energy absorbable by using the electric motor 28 is small, so that a maximum-possible amount of engine braking energy is used and, if necessary, friction braking energy based on liquid pressure is used as a supplement to meet the required braking energy.

Thus, the control method of the second embodiment fully utilizes regenerative braking energy achieved by the electric motor 28. If the amount of regenerative braking energy is not sufficient, engine braking energy is fully utilized and, if necessary, friction braking energy based on liquid pressure is used as a supplement. Therefore, as in the first embodiment, the second embodiment recovers a maximum amount of electric power into the battery 36 by using the electric motor 28, and therefore reduces the energy consumption of the vehicle. Furthermore, the second embodiment minimizes the use of friction braking energy and therefore minimizes the abrasion of the friction members of the brake device (not shown).

Although in the second embodiment, the priority sequence of regenerative braking energy, engine braking energy and friction braking energy is adopted to meet the braking energy requirement, such a distribution sequence is not restrictive. If the braking energy distribution priority sequence is eliminated, the freedom in control increases. This embodiment is able to achieve a predetermined braking energy without being restricted by the upper limit of regenerative braking energy achievable by the electric motor 28, regardless of the charged condition of the battery 36.

It is also possible to provide linear valve units 54 or main linear valve units 56 separately for the front wheel cylinders and the rear wheel cylinders and separately control the units.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A vehicle braking energy control apparatus for use with a vehicle that includes at least one wheel, a motor, a brake, and a brake pedal that is actuable into an off condition, the vehicle braking energy control apparatus comprising:

a regenerative energy control device that controls regenerative braking energy applied to the wheel of the vehicle by the motor; and a friction braking energy control device that controls friction braking energy regarding the brake, such that the friction braking energy can be applied in addition to the regenerative braking energy when the brake pedal is in the off condition.

2. The vehicle braking energy control apparatus according to claim 1, further comprising an engine braking energy control device that controls engine braking by an engine, wherein at least one of the friction braking energy and the engine braking energy can be applied in addition to the regenerative braking energy when the brake pedal is in the off condition.

3. The vehicle braking energy control apparatus according to claim 2, wherein the friction braking energy control device has at least one linear valve unit that operates only when the brake pedal is in the off condition and that variably controls liquid pressure on the basis of voltage.

4. The vehicle braking energy control apparatus according to claim 3, wherein a linear valve unit is provided for a rear wheel of the vehicle, and another linear valve unit is provided for a front wheel of the vehicle.

5. The vehicle braking energy control apparatus according to claim 1, wherein the friction braking energy control device has at least one linear valve unit that operates only when the brake pedal is in the off condition and that variably controls liquid pressure on the basis of voltage.

6. The vehicle braking energy control apparatus according to claim 5, wherein a linear valve unit is provided for a rear wheel of the vehicle, and another linear valve unit is provided for a front wheel of the vehicle.

7. The vehicle braking energy control apparatus according to claim 1, wherein an amount of regenerative braking energy and friction braking energy is controlled so that the regenerative braking energy is reduced and the friction braking energy is increased as a charged condition of a battery approaches a fully charged condition.

8. A vehicle braking energy control method, comprising:

controlling regenerative braking energy applied to a wheel of a vehicle by a motor;

controlling friction braking energy regarding a brake; and applying the friction braking energy in addition to the regenerative braking energy when a brake pedal is in the off condition.

9. The vehicle braking energy control method according to claim 8, further comprising:

setting a predetermined braking energy; and supplementing the regenerative braking energy with the friction braking energy to meet the predetermined braking energy when the brake pedal is in the off condition.

10. The vehicle braking energy control method according to claim 9, wherein the regenerative energy applied when the brake pedal is in the off condition is a maximum amount of regenerative energy.

11. The vehicle braking energy control according to claim 8, wherein an amount of regenerative braking energy and friction braking energy is controlled so that the regenerative braking energy is reduced and the friction braking energy is increased as a charged condition of a battery approaches a fully charged condition.

12. A vehicle braking energy control method, comprising:

controlling regenerative braking energy applied to a wheel of a vehicle by a motor;

controlling engine braking energy regarding an engine;

controlling friction braking energy regarding a brake; and applying at least one of the friction braking energy and the engine braking energy in addition to the regenerative braking energy when a brake pedal is in the off condition.

13. The vehicle braking energy control method according to claim 12, further comprising:

setting a predetermined braking energy; and supplementing the regenerative braking energy with at least one of the friction braking energy and the engine braking energy to meet the predetermined braking energy when the brake pedal is in the off condition.

14. The vehicle braking energy control method according to claim 13, wherein the regenerative energy applied when the brake pedal is in the off condition is a maximum amount of regenerative energy.

15. The vehicle braking energy control method according to claim 12, wherein an amount of regenerative braking energy and friction braking energy is controlled so that the regenerative braking energy is reduced and the friction braking energy is increased as a charged condition of a battery approaches a fully charged condition.

* * * * *